United States Patent
Kerner et al.

(10) Patent No.: US 11,307,299 B2
(45) Date of Patent: Apr. 19, 2022

(54) RADIO FREQUENCY BASED SENSING USING COMMUNICATION SIGNALS

(71) Applicant: Apple Inc., Cupertino, CA (US)

(72) Inventors: Michael Kerner, Tel Mond (IL); Zohar Agon, Tel Aviv (IL); Michael Ney, Be'er Sheva (IL)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 16/534,106

(22) Filed: Aug. 7, 2019

(65) Prior Publication Data

US 2021/0041549 A1    Feb. 11, 2021

(51) Int. Cl.

| | |
|---|---|
| *G01S 13/34* | (2006.01) |
| *G01S 13/28* | (2006.01) |
| *G01S 13/50* | (2006.01) |
| *H04W 64/00* | (2009.01) |
| *H04L 25/02* | (2006.01) |
| *H04L 27/26* | (2006.01) |

(52) U.S. Cl.
CPC ............ *G01S 13/34* (2013.01); *G01S 13/282* (2013.01); *G01S 13/50* (2013.01); *H04L 25/0256* (2013.01); *H04L 27/2613* (2013.01); *H04W 64/006* (2013.01)

(58) Field of Classification Search
CPC ........ G01S 13/34; G01S 13/282; G01S 13/50; H04L 27/2613; H04L 27/2695
See application file for complete search history.

(56) References Cited

U.S. PATENT DOCUMENTS

| | | | |
|---|---|---|---|
| 8,344,949 B2 | 1/2013 | Moshfeghi | |
| 9,986,572 B2 | 5/2018 | Kim | |
| 10,045,323 B2 | 8/2018 | Li | |
| 2013/0172020 A1* | 7/2013 | Aweya | G01S 5/0252 |
| | | | 455/457 |
| 2017/0195855 A1* | 7/2017 | Na | H04L 67/12 |
| 2017/0307728 A1* | 10/2017 | Eshraghi | G01S 7/282 |
| 2018/0017661 A1 | 1/2018 | Morioka | |
| 2018/0241822 A1* | 8/2018 | Davis | G01S 13/0209 |
| 2020/0305010 A1* | 9/2020 | Hadani | H04L 25/0226 |
| 2021/0311181 A1* | 10/2021 | Chae | G01S 13/9027 |

\* cited by examiner

*Primary Examiner* — Donald H B Braswell
(74) *Attorney, Agent, or Firm* — Kowert, Hood, Munyon, Rankin & Goetzel, P.C.

(57) ABSTRACT

Embodiments are presented herein of apparatuses, systems, and methods for a wireless device to perform sensing applications using communication signals. The first wireless device may determine to perform a sensing application and to perform the sensing application using a communication signal to be transmitted to a second device. In other words, the first wireless device may use a transmission that is scheduled for communication purposes to additionally perform sensing of one or more types. Example sensing or radar-like applications include estimating distance, motion, and/or angle to one or more objects or structures in the vicinity of the first wireless device. After transmitting the communication signal to the second wireless device, the first wireless device may receive a reflection of the communication signal. The first wireless device may use the reflection to perform the sensing application.

20 Claims, 14 Drawing Sheets

RADIO FREQUENCY BASED SENSING USING COMMUNICATION SIGNALS

TECHNICAL FIELD

The present application relates to wireless devices, and more particularly to apparatuses, systems, and methods for radio frequency sensing applications using data signals.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

One use case for wireless communication includes sensing applications, e.g., estimating the distance, motion, or angle between a wireless device and objects or structures. For example, ranging can provide the distance between one wireless device and an object or structure. However, existing wireless sensing technologies may interrupt communication. Accordingly, improvements in the field are desired.

SUMMARY

Embodiments are presented herein of, inter alia, systems, apparatuses, and methods for a wireless device performing a sensing measurement, such as ranging and/or angle-of-arrival, while simultaneously preforming communication with a second wireless device.

A first wireless device may perform communication with a second wireless device. At some time (or multiple times) during the communication, the first wireless device may determine to perform a sensing measurement. For example, the first wireless device may determine to sense/measure a range/distance, angle, speed, or velocity, etc. relative to a reflector such as an object, structure, or person. The first wireless device may use a single communication signal for dual purposes: 1) to communicate information to the second wireless device, and 2) to perform the sensing measurement of the reflector. Accordingly, the first wireless device may select one or more transmissions to the second wireless device and use these transmissions for the sensing measurement. The first wireless device may receive any number of reflections of the transmissions. Such reflections may be reflected from any type of reflector such as an object, structure, etc. Based on characteristics of the received reflections (e.g., time of flight, angle of arrival, relative speed or velocity, etc.) the first wireless device may perform the sensing measurement. For example, the first wireless device may estimate the distance and/or angle to the reflector(s). Further the first wireless device may estimate the relative motion (e.g., speed or velocity), of the first wireless device and the reflector(s).

The techniques described herein may be implemented in and/or used with a number of different types of devices, including but not limited to cellular phones, tablet computers, accessory and/or wearable computing devices, portable media players, vehicles, access points and other wireless local area network equipment, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
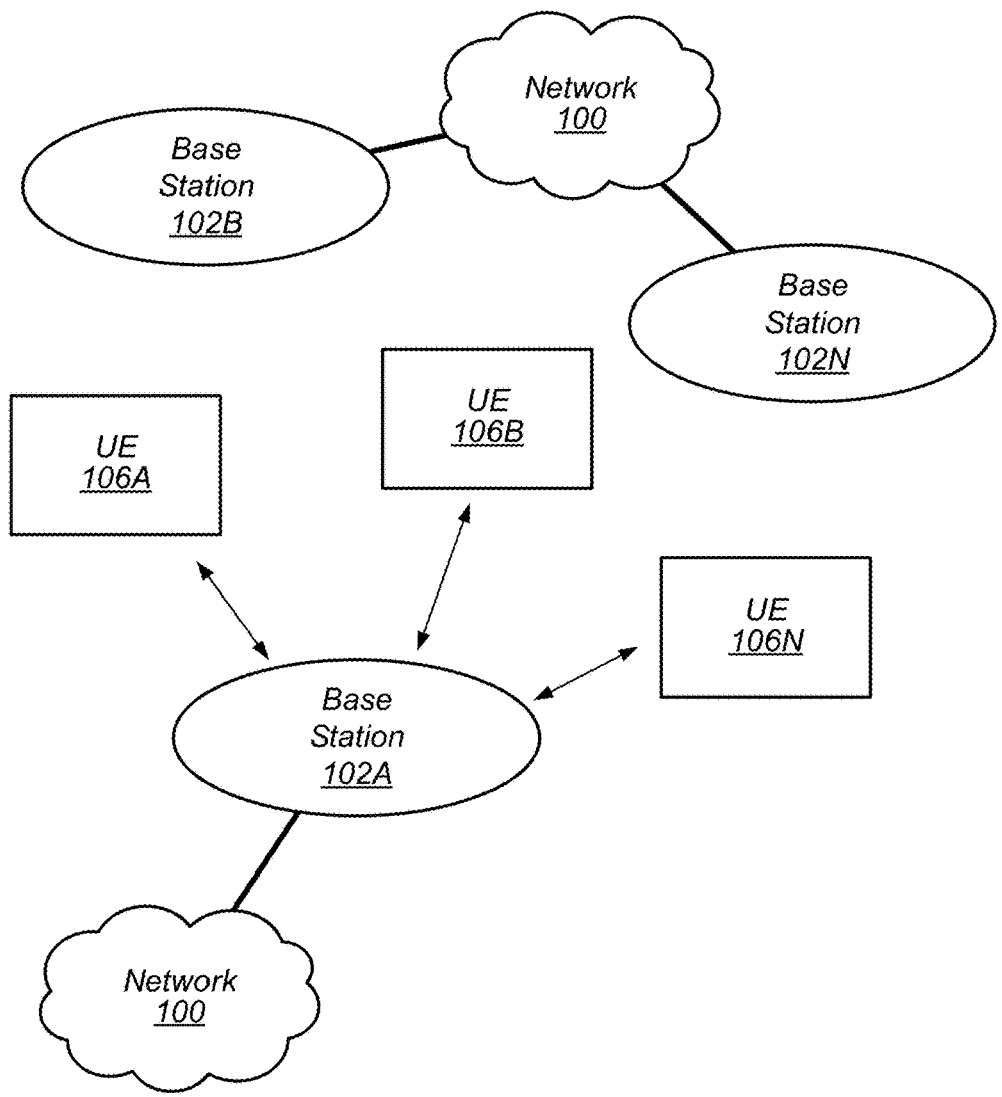
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device. A communication device may be referred to as a station or STA.

Base Station or Access Point (AP)—The term "Base Station" has the full breadth of its ordinary meaning, and at least includes a wireless communication station installed at a fixed location and used to communicate as part of a wireless telephone system or radio system. The term "access point" is used similarly.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network. Wi-Fi or WLAN may refer to technology based on IEEE 802.11 wireless standards such as 802.11a, 802.11.b, 802.11g, 802.11n, 802.11-2012, 802.11ac, 802.11ad, 802.11.ax, 802.11ay, 802.11az, and/or other IEEE 802.11 standards.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
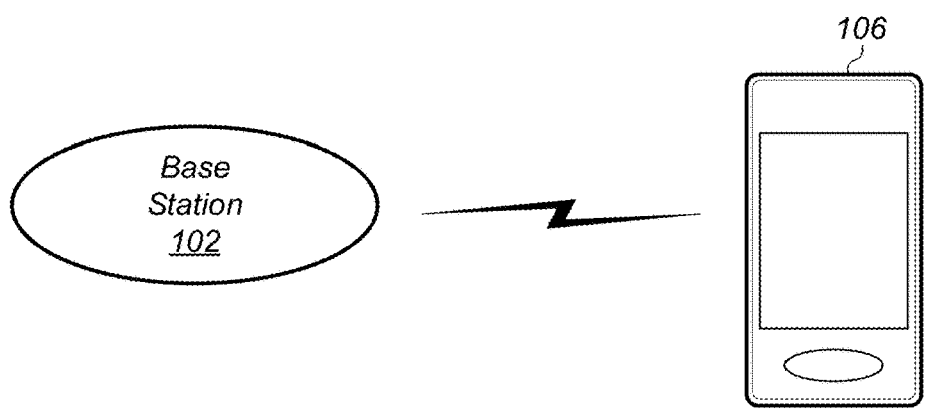
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as gNodeB' or gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, traces, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
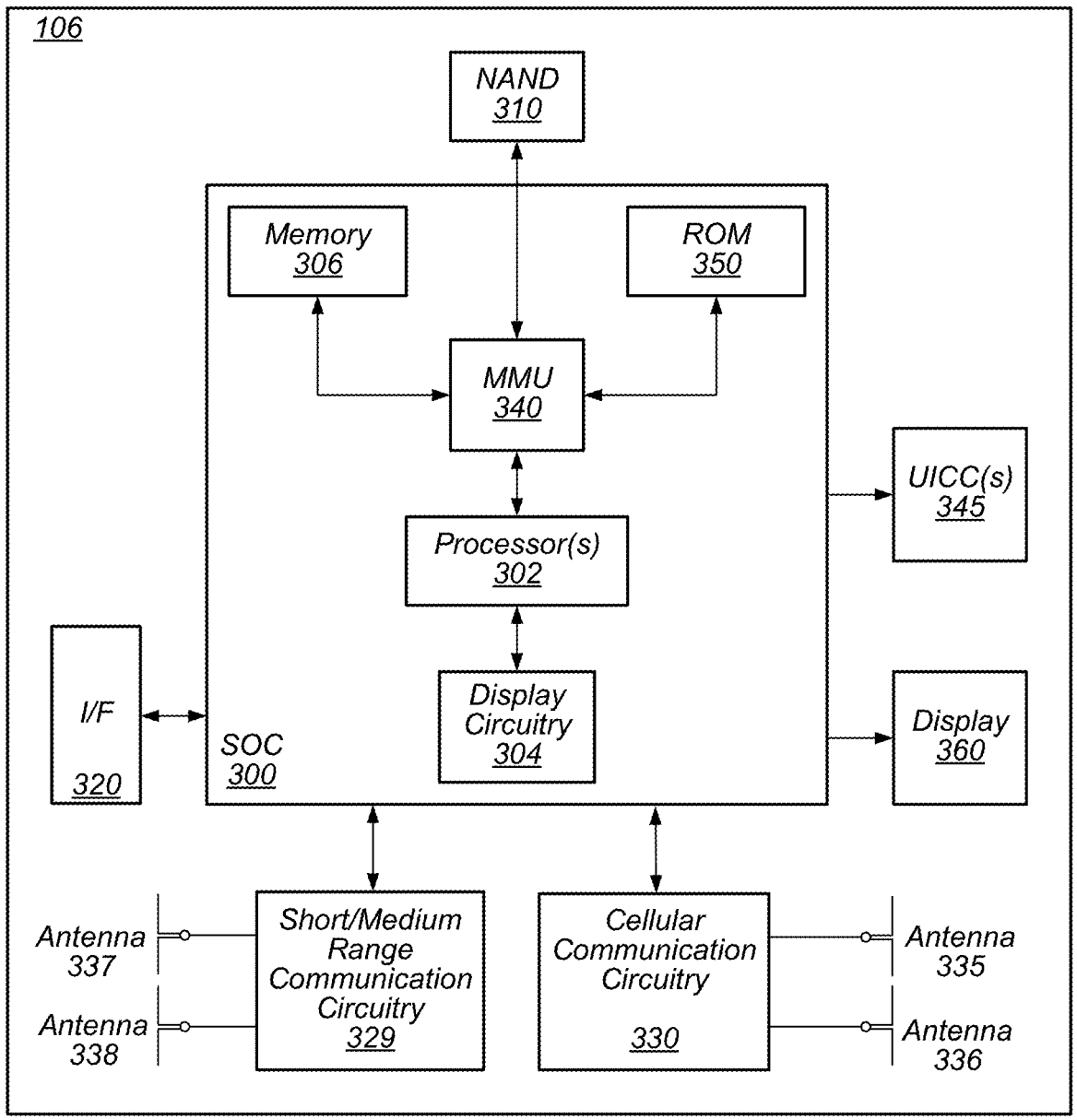
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
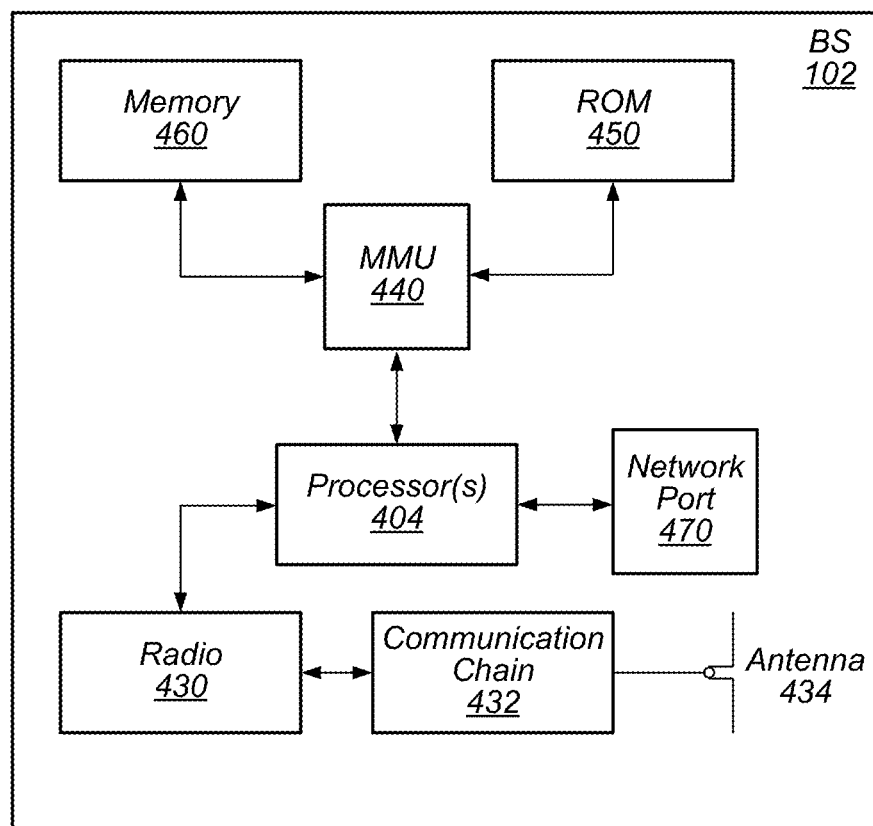
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
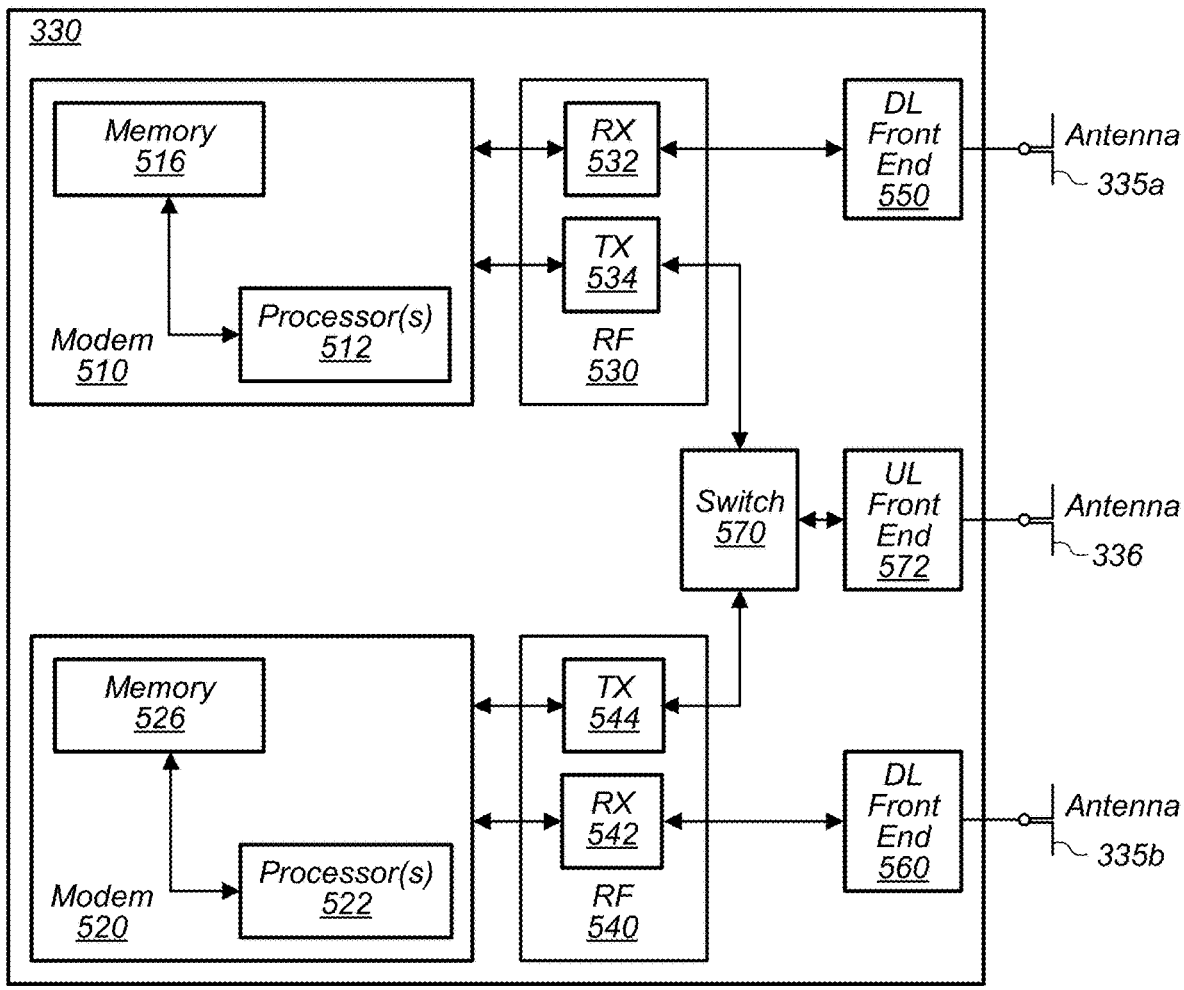
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains for multiple RATs (e.g., a first receive chain for LTE and a second receive chain for 5G NR). Such receive chains may include and/or be communicatively coupled (e.g., directly or indirectly) to dedicated processors and/or radios. For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
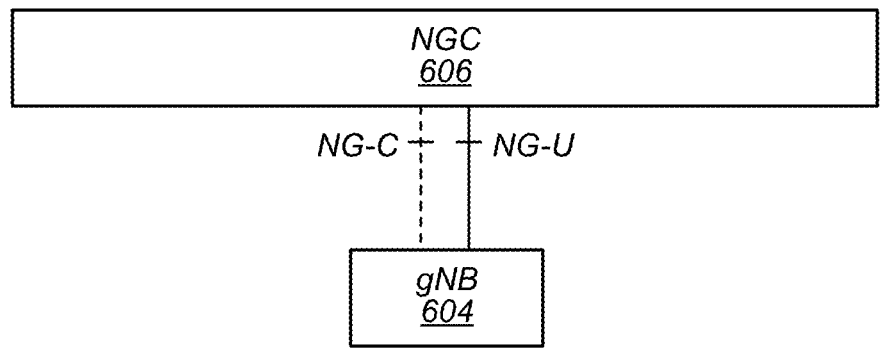
FIGS. 6 and 7 illustrate examples of a 5G NR base station (gNB), according to some embodiments.
Figure 7:
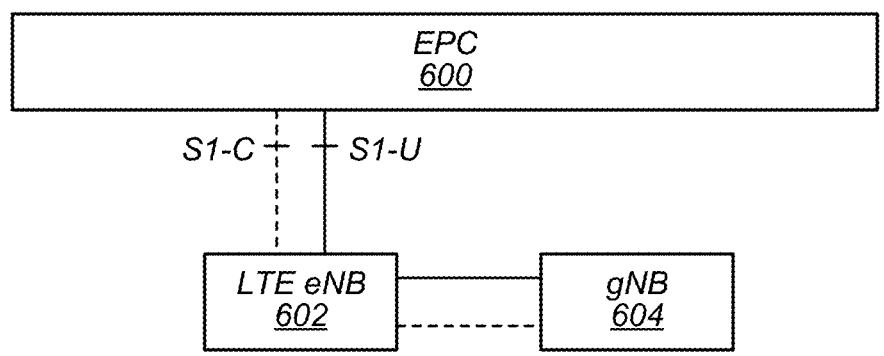

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
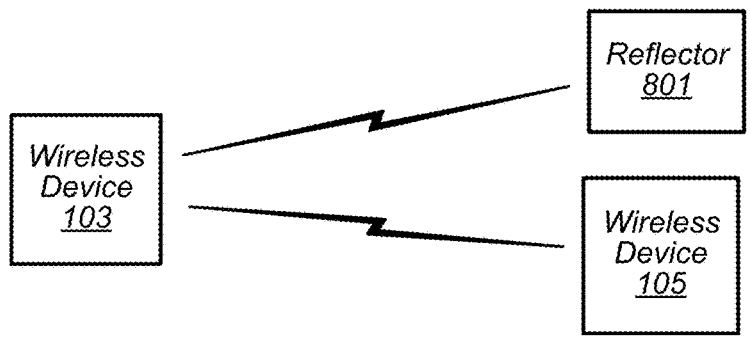
FIG. 8 is a block diagram illustrating an example method for performing sensing measurement during communication, according to some embodiments.

FIG. 8—Exemplary Sensing Environment

FIG. 8 illustrates an exemplary (and simplified) wireless communication system and environment in which aspects of this disclosure may be implemented. It is noted that the system and environment of FIG. 8 is merely one example of a possible system, and embodiments of this disclosure may be implemented in any of various systems, as desired.

As shown, the exemplary wireless communication system includes a ("first") wireless device 103 in communication with another ("second") wireless device 105. The first wireless device 103 and the second wireless device 105 may communicate wirelessly using any of a variety of wireless communication techniques, potentially including ranging or other sensing wireless communication techniques.

The environment may also include one or more reflectors 801. The reflector 801 may be or include any of numerous types of objects or structures. Among other examples, the reflector 801 may be a wall, floor, ceiling, piece of furniture, door, person, animal, electronic device (e.g., such as wireless device 105, or various other devices such as a TV, stereo, etc.), vehicle, etc. The wireless device 103 may use the sensing techniques described herein to perform one or more sensing measurements about reflector 801, e.g., while communicating with wireless device 105.

The sensing measurement or measurements may include one or more of a range or distance measurement (e.g., based on time-of-flight), an angle or direction measurement, a speed (e.g., rate of change of distance), or velocity (e.g., rate of change of distance and/or angle) measurement. For example, the first wireless device may estimate a Doppler shift of a reflection and use the Doppler shift to determine a relative speed of the reflector 801. The sensing measurement may be a relative measurement, e.g., a speed measurement may indicate a rate of change of the distance between the wireless device 103 and a reflector 801, e.g., regardless of whether the wireless device 103, the reflector 801, or both are moving.

As one possibility, the first wireless device 103 and the second wireless device 105 may communicate using wireless local area networking (WLAN) communication technology (e.g., IEEE 802.11/Wi-Fi based communication, such as WiGig (e.g., 60 GHz Wi-Fi as in 802.11ad, 802.11ay, etc., also known as millimeter (mm) wave band WLAN)) and/or techniques based on WLAN wireless communication. One or both of the wireless device 103 and the wireless device 105 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, Wi-Gig, GPS, etc. The ranging (or other sensing techniques) described herein may be performed using WLAN or various other wireless technologies, including BT, BLE, NFC, or cellular, etc.

The wireless devices 103 and 105 may be any of a variety of types of wireless device. As one possibility, one or more of the wireless devices 103 and/or 105 may be a substantially portable wireless user equipment (UE) device, such as a smart phone, hand-held device, a wearable device such as a smart watch, a tablet, a motor vehicle, or virtually any type of wireless device. As another possibility, one or more of the wireless devices 103 and/or 105 may be a substantially stationary device, such as a set top box, media player (e.g., an audio or audiovisual device such as a television), gaming console, desktop computer, appliance, smart door, access point, base station, or any of a variety of other types of devices. For example, the wireless devices 103 and 105 may be any of the devices illustrated in and described with respect to the FIGS. 1-7, among various possibilities. For example, either or both of wireless devices 103 and 105 may be an example of UE 106.

In addition to performing sensing of reflector 801, the two wireless devices 103 and 105 may perform sensing measurements relative to each other. For example, the ranging (or other sensing techniques) may be peer-to-peer (P2P). For example, P2P ranging may be performed between a television and a smart phone, or between two phones, among various possibilities.

Each of the wireless devices 103 and 105 may include wireless communication circuitry configured to facilitate the performance of wireless communication, which may include various digital and/or analog radio frequency (RF) components, a processor (such as, e.g., processor(s) 302, 404, 512, 522, baseband processor(s), processor(s) associated with communication circuitry, etc., among various possibilities) that is configured to execute program instructions stored in memory, a programmable hardware element such as a field-programmable gate array (FPGA), and/or any of various other components. The wireless device 103 and/or the wireless device 105 may perform any of the method embodiments described herein, or any portion of any of the method embodiments described herein, using any or all of such components. For example, the wireless device 103 and/or the wireless device 105 may include one or more processors or processing elements that may be configured to cause the device to perform any of the method embodiments described herein, or any portion of any of the method embodiments described herein, using any or all of such components.

Each of the wireless devices 103 and 105 may include one or more antennas for communicating using one or more wireless communication protocols. In some cases, one or more parts of a receive and/or transmit chain may be shared between multiple wireless communication standards; for example, a device might be configured to communicate using either of Bluetooth or Wi-Fi using partially or entirely shared wireless communication circuitry (e.g., using a shared radio or at least shared radio components). The shared communication circuitry may include or be coupled to a single antenna or multiple antennas (e.g., for multiple-input and multiple-output (MIMO)) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using one or more of LTE, CDMA2000 1×RTT, GSM, and/or 5G NR, and separate radios for communicating using each of Wi-Fi and Bluetooth. Other configurations are also possible.

As previously noted, aspects of this disclosure may be implemented in conjunction with the wireless communication system of FIG. 1. For example, the wireless device 103 may perform one or more sensing wireless communication techniques or features described subsequently herein with respect to the Figures. By utilizing such techniques (and/or other techniques described herein), the wireless device 103 may (at least according to some embodiments) be able to perform sensing measurements with improved communication performance relative to previous techniques, e.g., performing communication with the wireless device 105 and sensing of reflector 801 simultaneously. The wireless devices 103 and/or 105 may be referred to as STAs.

The illustrated spatial relationships between the wireless devices 103 and 105 and reflector 801 are exemplary only. The wireless devices 103 and 105 and reflector 801 may be in any positions relative to each other.

Figure 9:
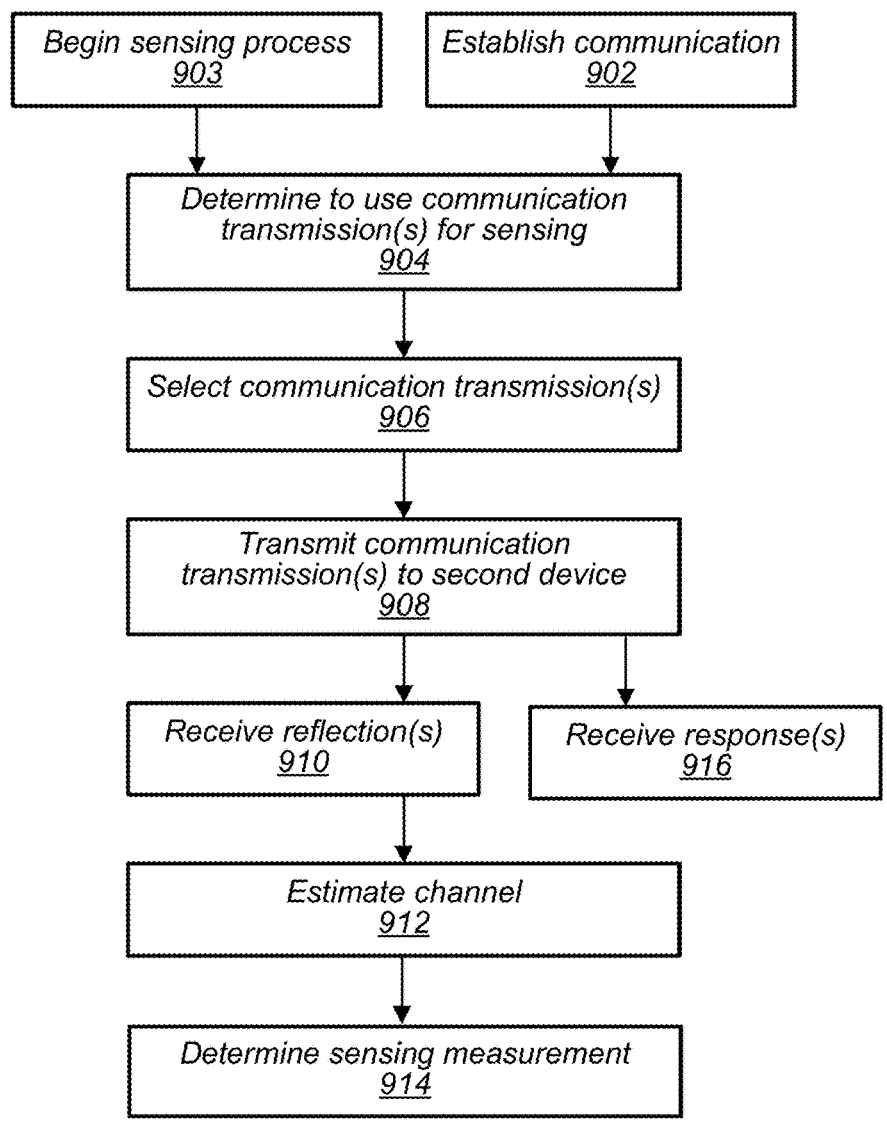
FIG. 9 is a flow chart diagram illustrating an example method for performing sensing measurement during communication, according to some embodiments.

FIG. 9—Sensing During Communication

Recent years have seen growing interest in radio frequency (RF) based sensing applications in consumer electronics platforms (e.g., cellular phones, tablets, smart watches, computers, etc.). Applications for such sensing measurements include: motion detection, tracking, collision avoidance, presence detection, sport activity tracking, non-contact user-interface (e.g., user-interface based on gesture recognition), health monitoring, etc. Providing such applications using communication hardware infrastructure (e.g., narrowband C-band WiFi) may enable high value applications, such as those mentioned above, without requiring significant (or any) hardware modifications. For example, by using wireless local area network (WLAN) transmissions to perform sensing, effective radiated power (ERP) generated for the WLAN transmissions may also be used to perform sensing without requiring additional hardware or additional energy use for transmission of sensing signals.

In conventional solutions, a wireless device 103 that wishes to sense its environment (e.g., reflector 801) may interrupt communication with a second wireless device 105 in order to transmit a signal for sensing. In other words, previous solutions do not provide for simultaneous sensing and communication. The interruption in the communication may have adverse consequences (e.g., delay, higher modulation and coding scheme (MCS) requirements, etc.).

Figure 19:
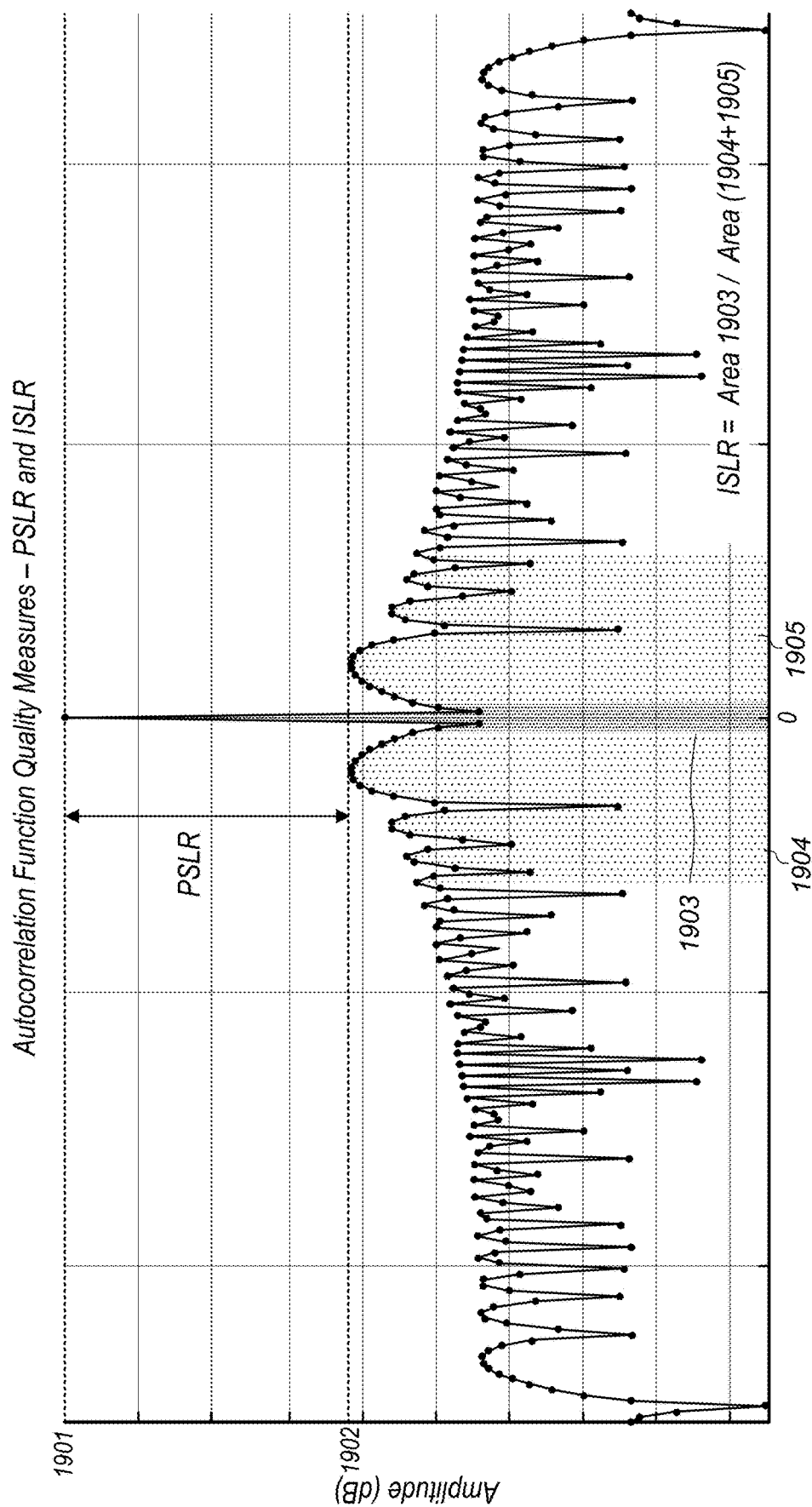
FIGS. 19 and 20 illustrate aspects of autocorrelation, according to some embodiments.

In sensing applications, e.g., radar-like applications, it may be common to use a Frequency-modulated continuous-wave radar (FMCW) signal. An FMCW signal may be preferred because it may be simple to generate in a radio and may offer a good (e.g., potentially approaching perfect) autocorrelation function, e.g., in terms of radar application. For example, an FMCW may have high peak-to-sidelobe ratio (PSLR) and high integrated sidelobe ratio (ISLR). PSLR and ISLR are illustrated in FIG. 19, which is discussed below.

Accordingly, improved methods for sensing during communication may be desired. FIG. 9 illustrates exemplary techniques for performing sensing based on a communication transmission, e.g., enabling the wireless device to avoid interrupting communication. According to the techniques of FIG. 9, a wireless device may use a communication transmission for dual purposes, e.g., to communicate information to a second wireless device and to sense/measure one or more reflectors.

Aspects of the method of FIG. 9 may be implemented by a wireless device, such as the wireless devices 103 and 105 as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) (e.g., processor(s) 302, 404, 512, 522, baseband processor(s), processor(s) associated with communication circuitry, etc., among various possibilities) may cause a wireless device to perform some or all of the illustrated method elements. Note that while at least some elements of the method are described in a manner relating to the use of communication techniques and/or features associated with 802.11 specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A wireless device 103 (e.g., a wireless device of any type) may establish communication with a second wireless device 105 (e.g., a wireless device of any type) (902), according to some embodiments. The communication may use any of various wireless technologies, including WLAN, cellular, BT, etc.

The wireless device 103 (e.g., a wireless device of any type) may determine to begin a sensing process (903). The sensing process may be a process to perform one or more measurements (e.g., range, angle, speed, velocity, etc.) of or relative to one or more objects or structures (e.g., reflector 801) in the environment (e.g., in the same room, or nearby, etc.) of the wireless device 103.

The determination to begin the sensing process may be based on any of various factors including: user input, application activity, a signal from another device (e.g., wireless device 105 or another device), a routine (e.g., a schedule of periodic and/or random sensing processes), one or more radio measurements (e.g., of channel conditions with wireless device 105 or another device, potentially compared to one or more thresholds), one or more past sensing measurements (e.g., measurements may be taken frequently if the wireless device 103 determines that it is getting close (e.g., within a threshold distance) to a reflector 801 or if a threshold speed in exceeded, etc.), activity of a motion sensor, or any of various other measurements or sensors. For example, a wireless device 103 may be configured with various mechanisms to trigger sensing measurements under various conditions such as proximity to another object or wireless device, rapid motion or acceleration, changing wireless conditions, etc. Similarly, the wireless device 103 may execute one or more applications (e.g., games, etc.) that periodically request sensing measurements.

The wireless device 103 may determine to use one or more communication transmissions or signals to perform a sensing measurement (904), according to some embodiments. In other words, the wireless device 103 may determine to perform the sensing process simultaneously or concurrently with data communications with wireless device 105, e.g., without interrupting ongoing data communications.

The wireless device 103 may consider various factors such as battery level, desired precision of the sensing measurement, and scheduled or expected communication activity (e.g., including transmission and/or reception) in order to determine to use communication signaling for sensing. For example, if the wireless device 103 determines that a high amount of communication activity is expected during a time period that it plans to perform the sensing measurement, it may determine to perform the sensing using a communication signal. As an alternative example, if the wireless device 103 determines that the expected amount of communication level is below a threshold (e.g., indicating that there may be breaks during which single purpose sensing signaling may be transmitted) and that the desired precision of the sensing measurement is high (e.g., above a precision threshold), the wireless device 103 may determine not to use communication signaling for sensing, and to perform sensing separately from the communication. In some embodiments, the wireless device 103 may determine to perform sensing using communication transmissions in order to conserve power, e.g., particularly if battery power is low.

The wireless device 103 may select one or more communication transmissions or signals to use for sensing (906), according to some embodiments. The wireless device 103 may select particular transmissions (e.g., packets or parts of packets, frames, protocol data units (PDU), subframes, waveforms, signals, etc.) to use based on any of various factors such as timing, direction, and/or characteristics of the transmission signals.

For example, the wireless device 103 may select communication transmissions that include channel estimation sequences. In communication protocols, channel estimation sequences may have the property of good autocorrelation function in terms of PSLR and ISLR. Accordingly, such channel estimation sequences may be useful for radar-like applications (e.g., sensing range, angle, motion, etc. of reflector 801). For example, in legacy WLAN standards, the long training field (LTF) (e.g., the legacy-LTF) may be used for channel estimation. Similarly, in WiGig, a channel estimation field (CEF) may be used for channel estimation. Similarly, various cellular technologies (e.g., LTE, NR) use various reference signals (e.g., pilot symbols) for channel estimation. Accordingly, the wireless device 103 may select to use channel estimation sequences transmitted as a component of WLAN and/or cellular signals to wireless device 105 for sensing.

In some embodiments, the wireless device 103 may select to use one or more data symbols for sensing. Among other possibilities, the wireless device 103 may determine the availability of channel estimation sequences in scheduled transmissions and may select to use data symbols for sensing if there are no (or too few, e.g., less than an availability threshold number or fraction) scheduled transmissions that include channel estimation sequences at the time of the desired sensing measurement. For example, due to packet aggregation during a large data transfer, some time periods may not include many or any channel estimation sequence transmissions. Similarly, the channel estimation sequences may be a limited (e.g., relatively small) fraction of a transmission. Accordingly, in some scenarios (e.g., with low SNR) it may be beneficial to use data symbols for sensing (e.g., instead of or in addition to channel estimation sequences) in order to perform an average over a larger number of symbols.

Selecting to use data symbols for sensing may require or may benefit from additional computation. For example, such computation may include the averaging of several consecutive symbols' range-compressed response to perform the sensing measurement. Such averaging may be beneficial because the data symbols may not exhibit perfect (e.g., or more than random) autocorrelation function. In other words, the autocorrelation function of data symbols may demonstrate undesired side-lobes (e.g., strong side-lobe peaks), which may lead to the detection of false targets or obscure real ones (e.g., the receiver may not be able to distinguish between the side-lobe peaks and reflections from other targets that may overlap in location).

The wireless device may select any number of transmissions (e.g., channel estimation sequences and/or data symbols) to use for the sensing measurement. The larger the number of symbols used, the more the channel estimation may be expected to converge, thus resulting in a more precise sensing measurement. A small number of channel estimation sequences (e.g., potentially a single channel estimation sequence) may be used, but a larger number (e.g., two or more) data symbols may be used to allow for averaging.

In some embodiments, the selected transmissions may be independent. In other words, the signals transmitted may be different from each other. For example, a first selected data symbol may be different than a second selected data symbol. Further, the wireless device may select transmissions minimize or maximize the correlation between the different transmissions.

In some embodiments, the wireless device 103 may modify a portion of a communication transmission in order to increase the autocorrelation. For example, in a scenario that the wireless device 103 has selected to use data symbols for sensing, the wireless device 103 may modify or add to the data symbols to increase autocorrelation. For example, some packet or frame structures may include padding or tail bits; the wireless device 103 may configure such padding or tail bits to increase autocorrelation. The wireless device 103 may perform such a modification in a manner configured to avoid interfering with communication with wireless device 105. For example, the wireless device 103 may indicate (e.g., using a field, alert, or flag, etc.) to the second wireless device 105 to disregard any bits or data symbols that are modified.

The wireless device 103 may transmit the selected communication transmissions or signals to the second wireless device 105 (908), according to some embodiments. The transmissions may be made according to a communication schedule (e.g., based on WLAN or cellular standards, etc.). In some embodiments, the communication schedule may be adjusted based on the use of the transmissions for sensing.

The wireless device 103 may use any number of antennas to transmit the communication signal(s). For example, an array of a number of antennas may be used. In some embodiments, such an array of antennas may be configured to transmit toward and/or receive from a particular direction or range of directions associated with a direction (e.g., a known or expected direction) of reflector 801 and/or wireless device 105. For example, if wireless device 105 is in a first direction (e.g., based on previous beamforming measurements), the wireless device 105 may transmit the signal(s) in that first direction. However, if the wireless device 103 wishes to sense reflector 801 in a second, different direction (or an unknown direction), the wireless device 103 may use a transmission beam that is sufficiently broad to transmit the signal(s) in a manner that includes both the first and the second directions. For example, the wireless device 103 may use an omnidirectional beam to transmit and/or receive the communication signals. In some embodiments, the wireless device may select a particular beam (or different transmit and receive beams) based on the use of the communication signals for sensing; the selected beam(s) may be different (e.g., broader) than a beam that would be selected if the communication signals were used for communication only.

In some embodiments, the wireless device 103 may adjust (e.g., increase) the transmission power based on the use of the transmissions for sensing. For example, the wireless device 103 may use higher power based on using a broader transmission beam than would be selected for a communication only transmission to the second wireless device 105.

The wireless device 103 may receive one or more reflections (e.g., echoes) of the communication transmissions (910), according to some embodiments. The reflections may be from the reflector 801 (or multiple reflectors 801). The reflections may differ from the transmitted communication transmissions. For example, the reflections may exhibit interference, distortion, Doppler shift, etc.

More than one reflection may be received for any one of the communication transmissions. For example, a first reflection of a first transmission may be reflected by a first reflector 801 and a second reflection of the first transmission may be reflected by a second reflector 801. Reflections may be line of sight and/or multipath (e.g., a reflection may be reflected by reflector 801 and off of a second reflector).

The wireless device 103 may use any number of antennas to receive the reflection. For example, an array of a number of antennas may be used. In some embodiments, such an array of antennas may be configured to receive from a particular direction or range of directions associated with a direction (e.g., a known or expected direction) of reflector 801.

The wireless device 103 may estimate a channel to the reflector 801 based on the received reflection(s) of the communication transmissions (912), according to some embodiments. In order to perform the channel estimate, the wireless device 103 may convert the received reflections to the frequency domain, e.g., using fast Fourier transform (FFT).

If a single channel estimation sequence is used for the sensing measurement, the channel response may be estimated by a zero forcing estimator or a minimum mean square error (MMSE) estimator. A zero forcing estimator may be given by equation 1:

$$\hat{H}(f) = \frac{Y(f) \cdot X^*(f)}{X(f) \cdot X^*(f)} = \frac{Y(f)}{X(f)}$$

In this equation, H(f) (hat) may be the estimated channel response as a function of frequency, Y(f) may be a received sequence (e.g., the reflection of the communication transmission), X(f) may be a known, transmitted communication, and X*(f) may be the complex conjugate of X(f). Similarly, a minimum mean square error (MMSE) estimator may be as illustrated in equation 2:

$$\hat{H}(f) = \frac{Y(f) \cdot X^*(f)}{X(f) \cdot X^*(f) + \sigma^2}$$

In this equation, $\sigma^2$ is a noise power estimate and other terms have the same meanings as in the zero forcing estimator of equation 1.

If multiple channel estimation sequences and/or data symbols are used for the sensing measurement, the channel response may be estimated by a modified zero forcing estimator or a modified MMSE estimator. In other words, the zero forcing estimator and/or MMSE estimator described above may be modified for estimating the channel using the desired number of reflected communication transmissions. For example, a modified zero forcing estimator for use with reflections of 2 different transmissions may be constructed as shown in equation 3:

$$\widehat{H(f)} = \frac{Y_1(f) \cdot X_1^*(f) + Y_2(f) \cdot X_2^*(f)}{X_1(f) \cdot X_1^*(f) + X_2(f) \cdot X_2^*(f)}$$

In this equation, $X_1$ and $X_2$ represent the first and second transmissions, $X_1^*$ and $X_2^*$ represent the complex conjugates of the first and second transmissions, and $Y_1$ and $Y_2$ represent the corresponding received reflections.

Similarly, a modified MMSE estimator may be constructed as shown in equation 4:

$$\widehat{H(f)} = \frac{Y_1(f) \cdot X_1^*(f) + Y_2(f) \cdot X_2^*(f)}{X_1(f) \cdot X_1^*(f) + X_2(f) \cdot X_2^*(f) + \sigma^2}$$

These modified estimators may provide a means of averaging the reflections to avoid an incorrect channel estimate associated with a side lob of the reflection (e.g., particularly in the case of data symbols, which may not have good autocorrelation). Further, the modified estimators may avoid any problems estimating a channel associated with frequency nulls in one of the reflections (e.g., because different data symbols are unlikely to have nulls at the same frequency).

It will be appreciated that the modified zero forcing estimator and/or the modified MMSE estimator may be readily adapted to any number of communication transmissions. For example, additional X, X*, and Y terms may be incorporated according to the desired number of transmissions. As noted above, a larger number of transmissions may result in a more accurate channel estimate, and thus a more accurate sensing measurement.

It will be appreciated that averaging of multiple communication transmissions may be done in the frequency domain (e.g., as with equations 1-4) or in the time domain. To estimate the channel using data symbols, it may be beneficial to average multiple data symbols. Any of various methods of averaging (e.g., in the time or frequency domains) may be used.

The wireless device 103 may determine a sensing measurement based on the channel estimate of the reflection(s) (914), according to some embodiments.

For example, in order to determine range to the reflector 801, the wireless device 103 may determine a round trip time-of-flight (ToF) (e.g., a difference between a time of transmission of a communication transmission and the arrival time of the corresponding reflection), divide the ToF by the speed of light, and divide by 2. The arrival time may be determined based in part on the channel estimate, e.g., based on the received reflections matching the communication transmissions with a sufficiently high confidence. For example, a frequency domain channel estimation (e.g., equations 1-4) may be transformed using inverse FFT (IFFT) to the time domain to generate a compressed pulse. The compressed pulse may be used for the sensing measurement (e.g., any radar-like application).

The channel estimation may be used for a fine (e.g., more precise) ToF estimation. The fine ToF estimation may be determined based on finding the delay of the first arrival path (e.g., the first significant peak) in the channel estimate. For example, the arrival time may be estimated as the first time that the value of the channel estimator reaches a threshold value. Such a threshold value may indicate a match (e.g., with sufficient confidence) between the received reflections and the corresponding communication transmissions. Further, the fine ToF estimation may use a high resolution (e.g., "super resolution") which may be higher than the sample rate. There are multiple possible techniques to extract the first arrival path from a channel estimate, for example: maximum likelihood based methods, subspace based techniques, etc. Any or all of such techniques may be used to estimate the arrival time and thus the ToF. For example, a threshold based estimation may serve as a first, preliminary phase of a ToF estimation, and a more precise ToF estimation may be performed (e.g., in a second phase) using maximum likelihood based methods, subspace based techniques, etc.

Similarly, in order to determine angle-of-arrival (AOA) of the reflection (and thus direction to the reflector 801), the wireless device 103 may compare the phase of the reflection(s) as received by different antennas.

The wireless device 103 may receive one or more responses, from wireless device 105, to the communication transmissions (916), according to some embodiments. The response(s) may be any type(s) of communication transmission. For example, a response may include an acknowledgement (ACK) or negative acknowledgement (NACK) or other indicator of whether or not a packet was correctly received by the wireless device 105. A response may include payload data. It will be appreciated that a response may be received at any time, e.g., before, during, or after any of the method elements described above with respect to 910, 912, and 914. It will be appreciated that a response from wireless device 105 is distinct from a reflection from reflector 801. In some embodiments, no response may be received. The wireless device 103 may continue communication (e.g., including transmitting and/or receiving) with wireless device 105 based on the response, e.g., the communication may continue uninterrupted by the sensing measurement.

It will be appreciated that the actions of 902-906 are illustrated in an exemplary order. For example, the wireless device 103 may determine to begin the sensing process prior to establishing communication with the wireless device 105. For example, the communication signal(s) used for the sensing process may be the first signals sent from wireless device 103 to wireless device 105, according to some embodiments.

In some embodiments, the wireless device 103 may use information from the sensing measurement(s) in conjunction with other information or measurements. For example, the wireless device 103 may use a relative speed or velocity measurement performed as discussed above in conjunction with information about its location (e.g., from global positioning system, etc.) or motion (e.g., from a motion sensor, accelerometer, etc.) to determine an absolute speed or velocity of reflector 801.

In some embodiments, the wireless device 103 may receive reflections (e.g., in 910) of multiple reflectors 801.

The wireless device 103 may distinguish (e.g., in 912) between the reflections from the different reflectors 801. Accordingly, the wireless device 103 may determine sensing measurements (e.g., in 914) of the various multiple reflectors 801. For example, the wireless device 103 may determine a first distance (and/or angle, etc.) to a first reflector 801 and a second distance (and/or angle, etc.) to a second reflector 801.

Figure 11:
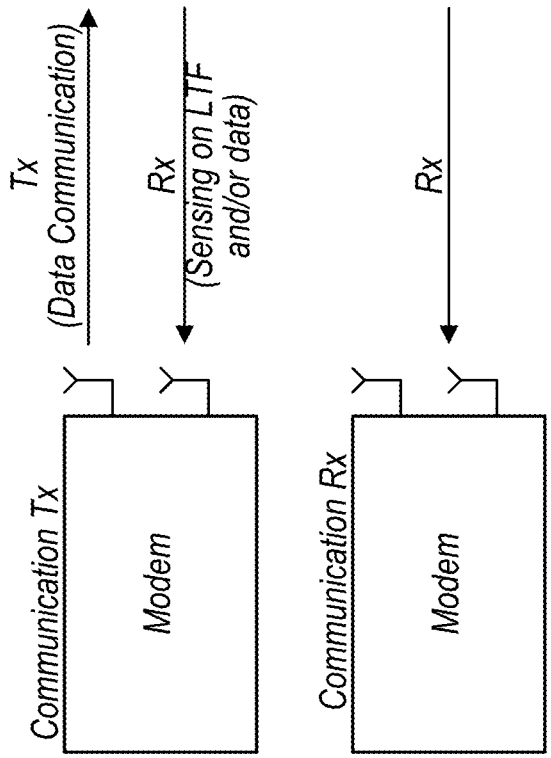
FIG. 11 illustrates an example of performing sensing and communication in parallel, according to some embodiments.
Figure 10:
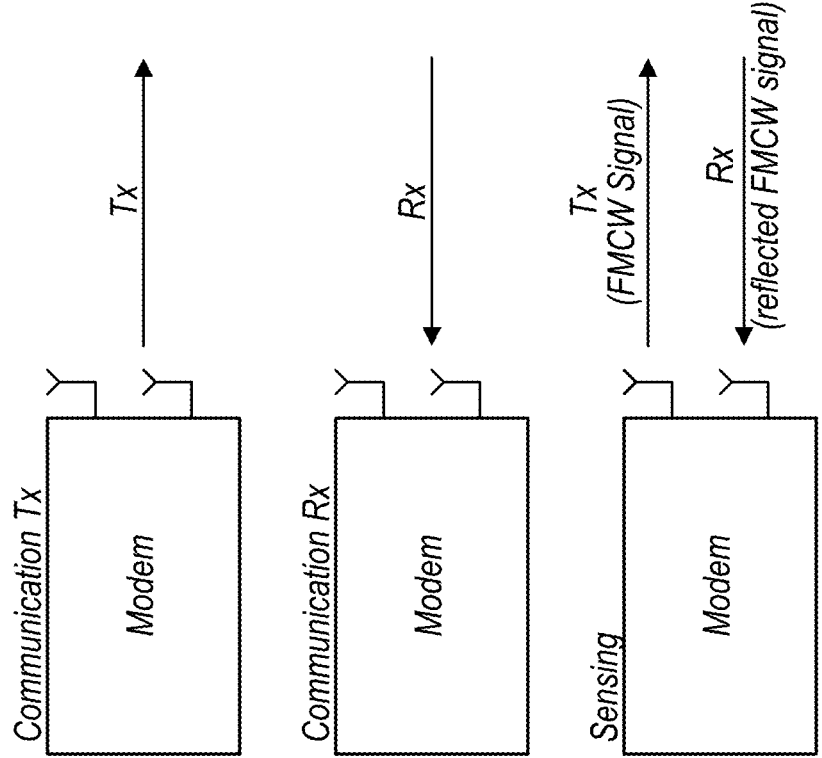
FIG. 10 illustrates an example of performing sensing and communication in sequence, according to some embodiments.

FIGS. 10 and 11—Sensing and Communication Examples

FIG. 10 illustrates an example of performing sensing and communication in sequence, according to some embodiments. For example, if (e.g., in 904) a wireless device 103 determines to perform a sensing process without using a communication transmission (e.g., because no communication transmissions are scheduled at a convenient time), the wireless device may perform activities as illustrated in FIG. 10. As illustrated, the wireless device 103 may transmit (Tx) a communication transmission at a first time and receive (Rx) a response to the communication signal at a second time. At a third time, the wireless device 103 may perform the sensing process by transmitting an FMCW signal and receiving the reflection of the FMCW signal.

FIG. 11 illustrates an example of performing sensing and communication in parallel (e.g., simultaneously, concurrently), according to some embodiments. For example, if (e.g., in 904) a wireless device 103 determines to perform a sensing process using a communication transmission (e.g., avoiding interrupting a communication flow), the wireless device may perform activities as illustrated in FIG. 11. At a first time, the wireless device 103 may transmit a communication signal (e.g., data communication) to the second wireless device 105 as discussed at 908, and may receive a reflection(s) of the communication signal as discussed at 910. The wireless device 103 may use the reflection(s) to perform sensing as discussed with respect to 912 and 914. At a second time, the wireless device 103 may receive a response from the second wireless device 105 as discussed with respect to 916.

Figure 12:
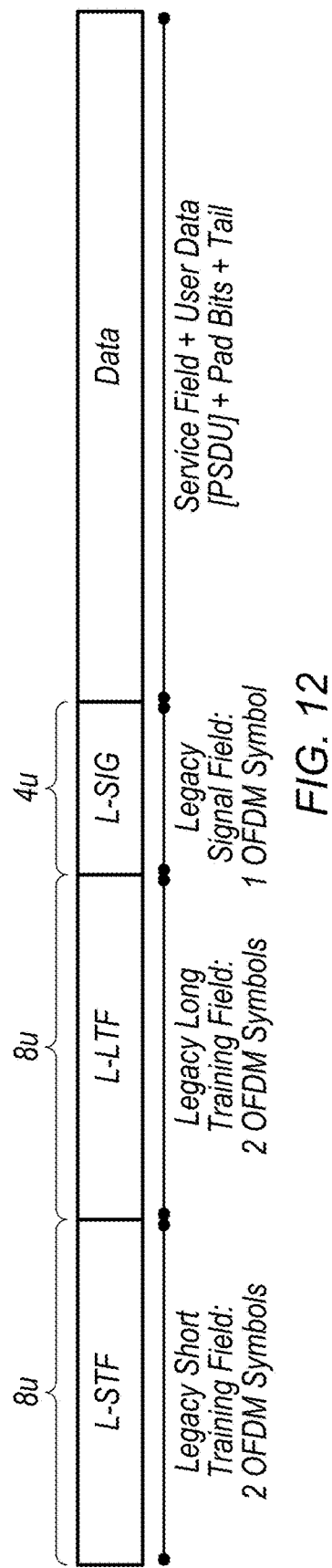
FIGS. 12-14 illustrate various exemplary communication signals, according to some embodiments.
Figure 13:
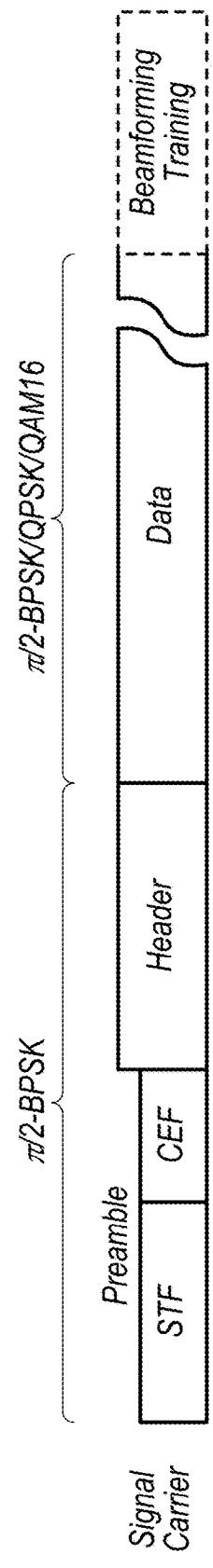
Figure 14:
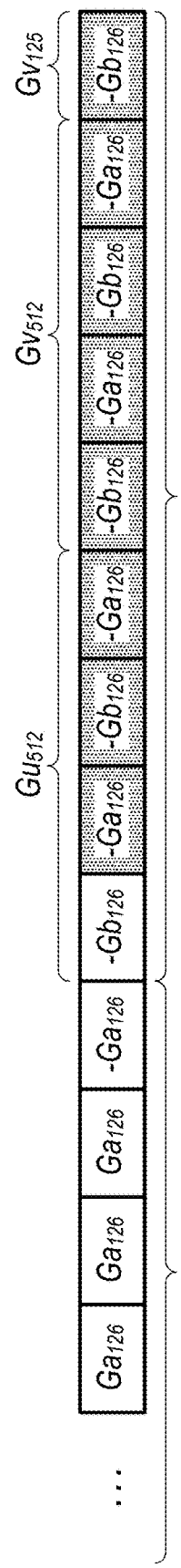

FIGS. 12-14—Communication Transmission Examples

FIG. 12 illustrates an example of WLAN (legacy type) frame structure that may be used for simultaneous communication and sensing. As shown, the frame includes a 2 orthogonal frequency division multiplexing (OFDM) symbol legacy short training field L-STF, a 2 OFDM symbol L-LTF (e.g., which may be used for channel estimation and sensing), a 1 OFDM symbol legacy signaling (L-SIG) field, and a data field. It will be appreciated that any component of the frame may be used for sensing according to the techniques of FIG. 9. However, the L-LTF may offer advantages for sensing (e.g., autocorrelation).

FIG. 13 illustrates an example of WLAN (e.g., 802.11ad/ay, 60 GHz) frame structure that may be used for simultaneous communication and sensing. As shown, the frame includes an STF, a channel estimation field (CEF) (e.g., which may be used for channel estimation and sensing), a header, data, and (optionally) a beamforming training field. It will be appreciated that any component of the frame may be used for sensing according to the techniques of FIG. 9. However, the CEF may offer advantages for sensing (e.g., autocorrelation).

FIG. 14 illustrates further detail of the STF and CEF of FIG. 13. The CEF may be a binary complementary sequence, e.g., out-of-phase aperiodic autocorrelation coefficients sum to zero. Specifically, the CEF may use Golay sequences and the autocorrelation of the Golay sequence is a delta function. The delta function autocorrelation may be useful for sensing (e.g., radar like applications).

Figure 15:
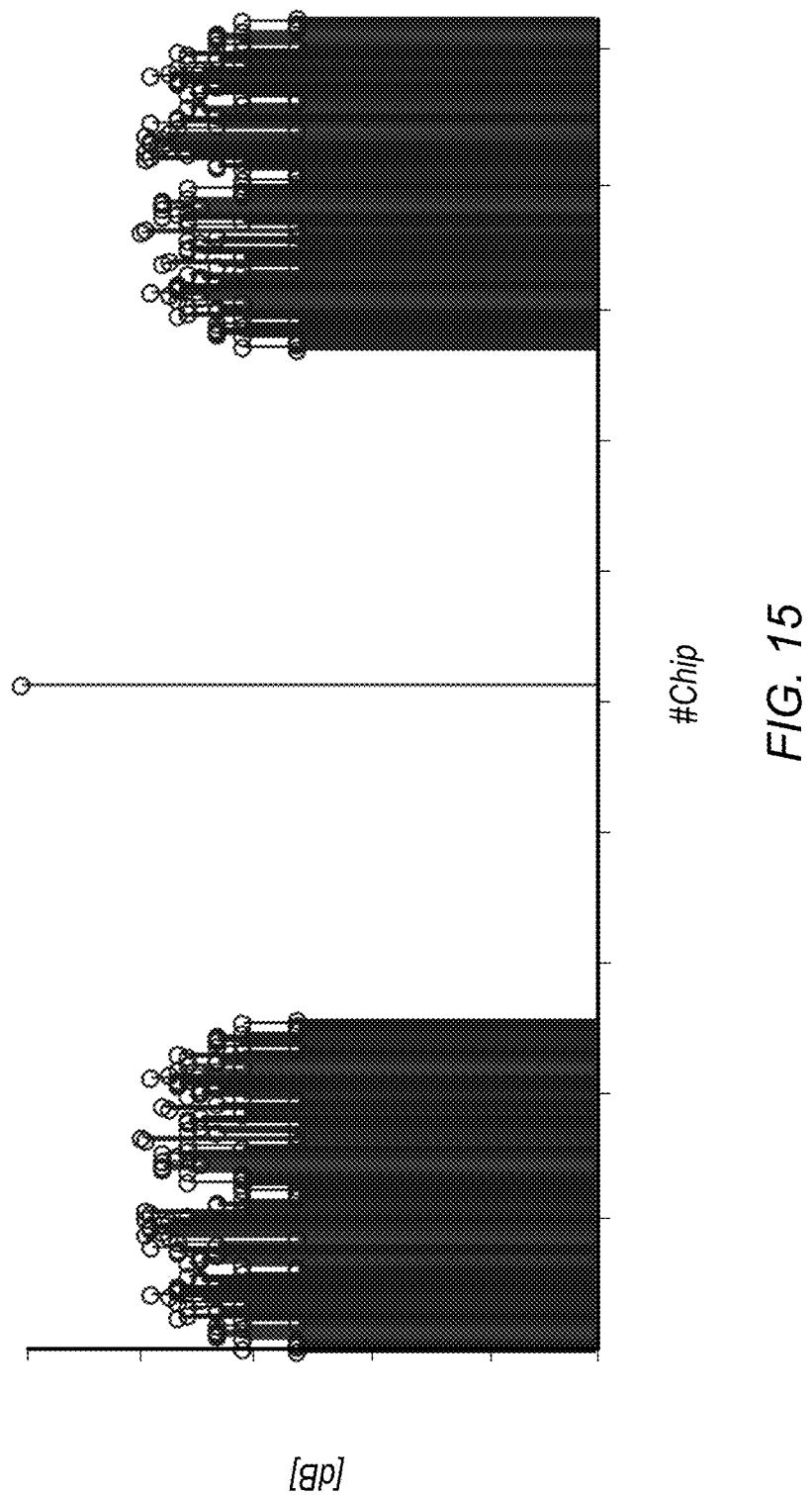
FIG. 15 illustrates an example of reflections, according to some embodiments.

FIG. 15—Autocorrelation and Reflection

FIG. 15 illustrates an example of a periodic autocorrelation function (PAF) of a CEF. A CEF may have a cyclic prefix (CP) with length of a number of chips (e.g. pulses). At a given bandwidth (e.g., a number of GHz), transmitting the CP may last for a period of time (e.g., x ns). Over this time, the transmitted signal may travel to and from a reflector 801 up to a (e.g., one-way) threshold distance (e.g., y m, where 3e8 m/s*x ns/2=y m), which may be referred to as an equivalent distance. Assuming that the channel (e.g., distance between wireless device 103 and reflector 801) is shorter than the equivalent distance of the CP, the matched filter delay profile (e.g., compressed pulse of the reflection, as received by wireless device 103) may be (e.g., approximately) equal to the PAF. There may be no sidelobes of the PAF for a complementary sequence of the number of chips, such as the CP.

In other words, if the bandwidth used to transmit the CEF is sufficiently high, the transmitted signal is similar to a delta function (e.g., a single peak). Thus, different reflectors may be separable in time and may not superimpose (e.g., the various reflections from different reflectors may each appear as various respective single peaks). In contrast, if bandwidth is low, transmitting the CEF may take more time, and may generate a relatively smooth signal (unlike a delta function). In such a case, reflections from different reflectors may superimpose and may be difficult to distinguish from one another. Thus, the larger the bandwidth that is used, the more easily different reflections may be distinguished, and in turn a better sensing estimate may be achieved.

Figure 16:
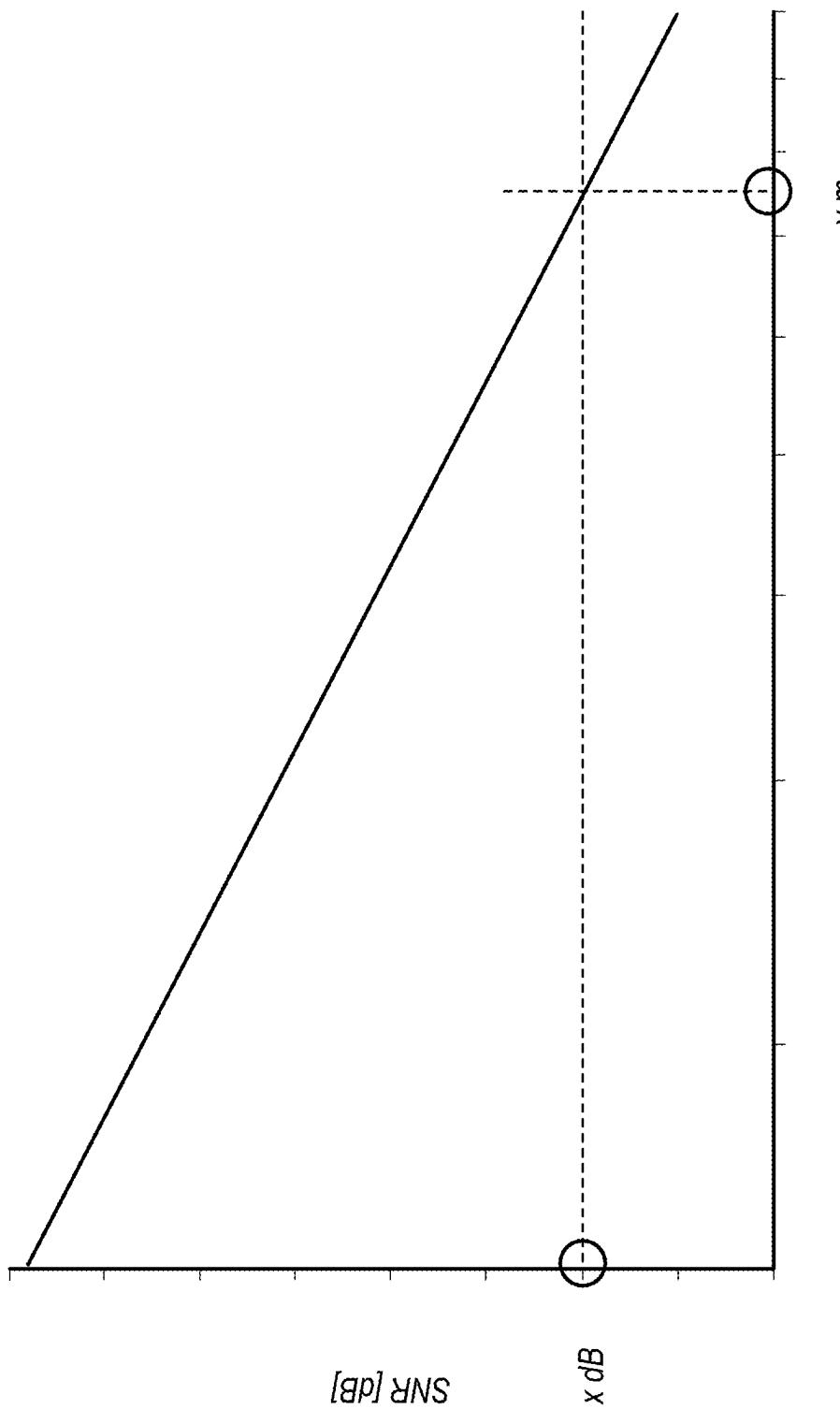
FIG. 16 illustrates an example of the distance at which reflectors may be detected, according to some embodiments.

FIG. 16—Threshold of Detection

FIG. 16 illustrates an example of an achieved signal to noise ratio (SNR) of the reflection of a CEF as a function of distance/range. For a given effective isotropic radiated power (EIRP) (e.g., transmission power of the CEF), radar cross section (RCS) (e.g., related to the size of the reflector, e.g., measured in dBsm), loss, noise figure (NF), noise factor, processing gain, and integration interval (e.g., Tint), a reflector may be detected at a threshold distance corresponding to a threshold SNR. In the illustrated example, assuming a threshold SNR of x dB (e.g., a reflection with SNR of at least x dB may be detected), a reflector at a distance of y m may be detected based on the reflection of the CEF. For example, the wireless device 103 may be able to detect any reflectors (with a threshold RCS) within a threshold radius around the wireless device 103.

Note that the illustrated graph is exemplary only and that other SNR thresholds and other assumptions may be used, and may generate different threshold distances. For example, a reflector with a larger RCS may be detectable at a greater distance while a smaller reflector (e.g., lower RCS) may need to be closer to be detected at the same SNR threshold. Similarly, transmitting the CEF with a higher transmit power (larger EIRP) may result in detecting a reflector (with a particular RCS) at a greater distance than a lower transmit power.

Figure 17:
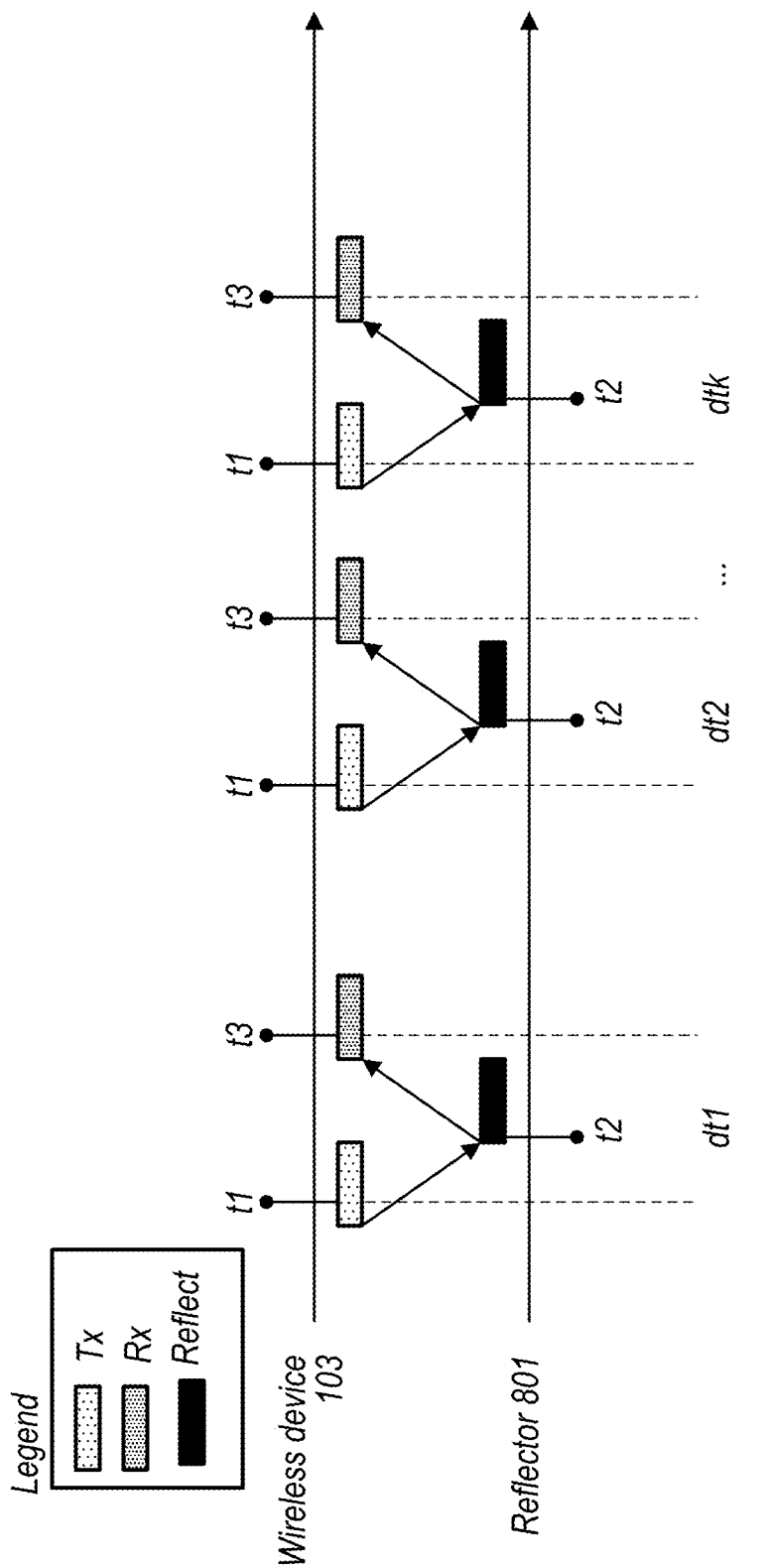
FIGS. 17 and 18 illustrate exemplary sensing measurements, according to some embodiments.
Figure 18:
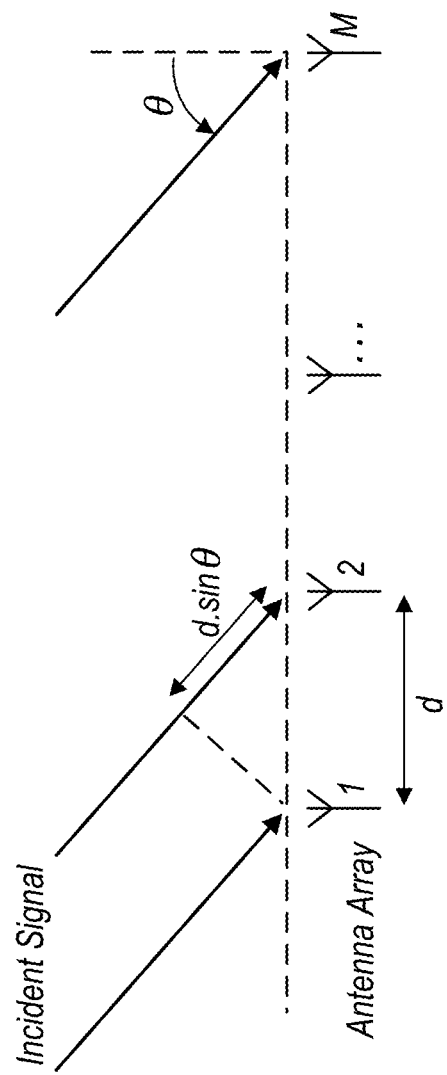

FIGS. 17 and 18—Exemplary Sensing Measurements

FIG. 17 is a timing diagram illustrating sensing, according to some embodiments. Wireless device 103 may transmit various signals (e.g., to wireless device 105, not shown) and may use reflections of those signals to sense reflector 801.

At a first time, t1, wireless device 103 may transmit a communication transmission. The communication transmission may include any number of channel estimation sequences (including zero).

At a second time, t2, reflector 801 may reflect the communication transmission.

At a third time, t3, wireless device 103 may receive the reflection.

As illustrated the wireless device 103 may send any number (e.g., k) of communication transmissions and receive corresponding reflections. The plurality of various reflections can be used for a single channel estimate (e.g., using a channel estimator such as equations 3 or 4, e.g., with k terms) or for a number of different channel estimates (e.g., to periodically update a sensing measurement over time).

Wireless device 103 may calculate the ToF (e.g., dt1) based on the difference between t3 and t1, and may thus estimate the distance to reflector 801 (e.g., dt1*(speed of light)*(½)=distance). In order to estimate the ToF, the wireless device 103 may estimate the channel based on the reflection. At the time of the first significant peak of the channel estimate, wireless device 103 may determine a the round-trip ToF (e.g., dt1)

It will be appreciated that determining a range/distance between the wireless device 103 and reflector 801 is distinct from determining a communicative range of wireless device 103 (or wireless device 105). For example, if wireless device 103 has a communicative range of a first distance (e.g., x meters), the range/distance to the reflector 801 may be a second, different distance (e.g., y meters). The ToF measurement may be useful to determine the distance between wireless device 103 and reflector 801.

FIG. 18 illustrates Angle of arrival (AOA) of an incident signal (e.g., a reflection of a communication transmission) at an antenna array of M antenna elements. As shown, the distance between two of the antennas (e.g., antennas 1 and 2) may be denoted as d. The angle of incidence (measured from the axis of the antenna) may be denoted as $\theta$ and may be estimated using the phase difference of the incident signal between the antennas. The phase difference may correspond to the distance $d*\sin(\theta)$. Deciphering the phase differences between antenna elements architecture may require orthogonal reception, according to some embodiments.

Figure 20:
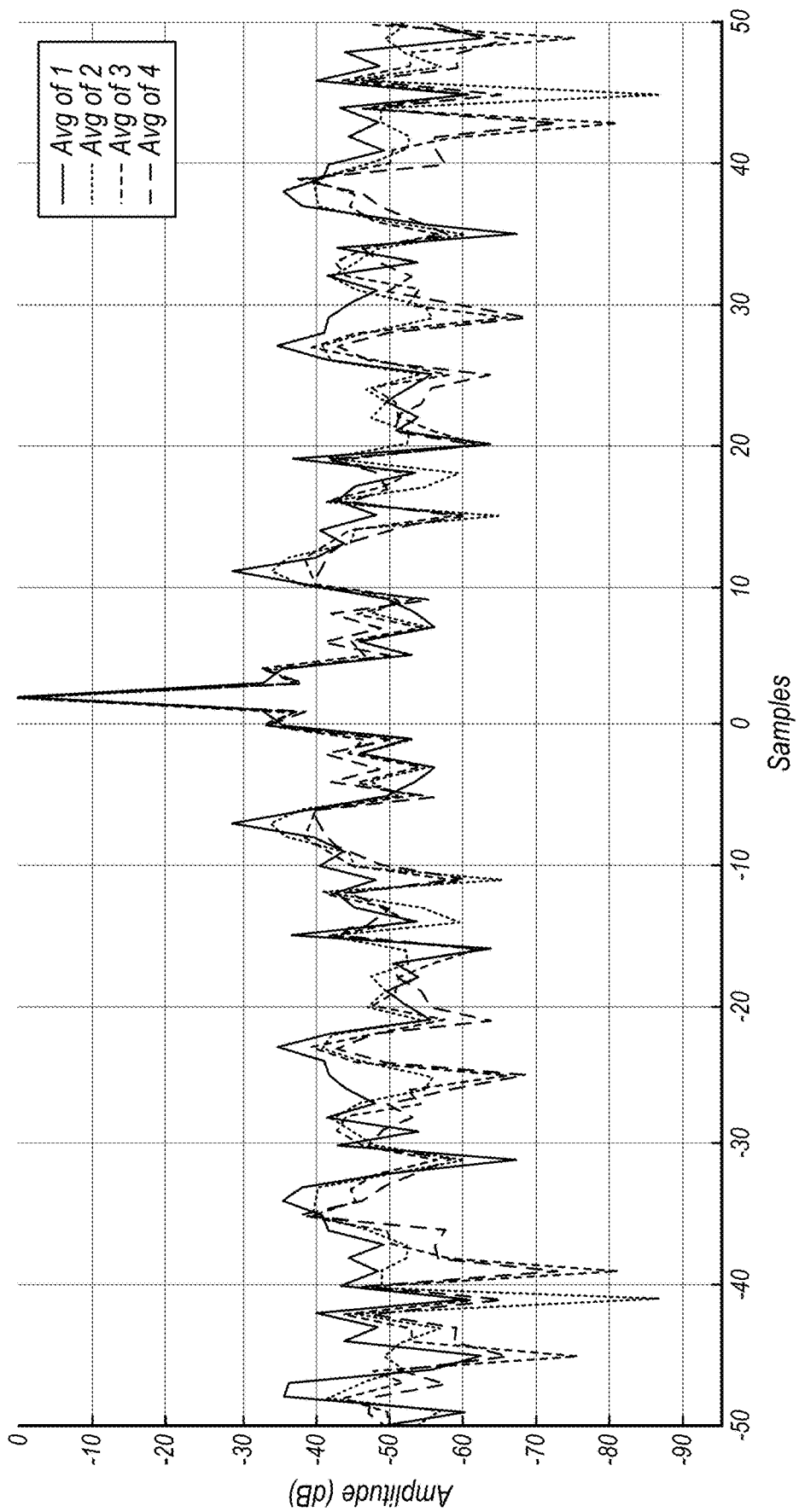

FIGS. 19 and 20—Autocorrelation

FIG. 19 illustrates peak-to-sidelobe ratio (PSLR) and integrated sidelobe ratio (ISLR), according to some embodiments.

PSLR may be defined as the ratio in decibels (dB) of the autocorrelation function's peak value to the peak value of the strongest side-lobe outside the mainlobe area (+/−2.5 resolution cells around the peak value). Thus, in the illustrated example, PSLR may be equal to peak amplitude 1901 divided by side-lobe amplitude 1902.

ISLR may be defined as the ratio in decibels (dB) between the integrated power within the autocorrelation function's mainlobe (+/−2.5 resolution cells around the peak value, e.g., dotted area 1903) to the integrated power in the autocorrelation function outside the mainlobe and up to some number (e.g. 30) of resolution cells from the mainlobe (e.g., dotted areas 1904 and 1905). For example, in the illustration ISLR may be equal to 1903/(1904+1905).

The PSLR and ISLR properties of the autocorrelation function may be measures of the quality of target localization, rejection of neighboring target occlusion and false target rejection.

FIG. 20 illustrates the impacts of averaging various numbers of symbols on an autocorrelation function, according to some embodiments. As shown, averaging a larger number of symbols may serve to smooth out various sidelobes. In other words, the average of 4 may more clearly represent the main lobe because the amplitude of the side lobes is reduced due to the averaging (e.g., relative to the amplitude of the side lobes with fewer symbols averaged). It will be appreciated that the illustrated autocorrelation function and numbers of symbols averaged are exemplary only.

Additional Information and Examples

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for managing a first wireless device, the apparatus comprising:
  a processor configured to cause the first wireless device to:
    determine to perform a measurement of distance to a reflector using one or more communication transmissions scheduled for transmission to a second wireless device, wherein the measurement of the distance to the reflector is concurrent with communication with the second wireless device;
    transmit the one or more communication transmissions to the second wireless device;
    receive at least one reflection of the one or more communication; transmissions;
    perform, based on the at least one reflection, the measurement of the distance to the reflector; and
    determine to perform a second measurement of the distance to the reflector using a frequency-modulated continuous-wave radar (FMCW) signal, wherein the determination to perform the second measurement of the distance to the reflector using the FMCW signal is based on a determination that an expected amount of communication is below a threshold.

2. The apparatus of claim 1,
wherein the one or more communication transmissions include data and the at least one reflection of the one or more communication transmissions includes a reflection of the data, wherein the measurement of the distance to the reflector is performed based on the reflection of the data.

3. The apparatus of claim 1, further configured to cause the first wireless device to receive, from the second wireless device, a response to at least one of the one or more communication transmissions, wherein the response is separate from the at least one reflection.

4. The apparatus of claim 1,
wherein the one or more communication transmissions include a channel estimation sequence and the at least one reflection includes a reflection of the channel estimation sequence, wherein the measurement of the distance to the reflector is performed based on the reflection of the channel estimation sequence.

5. The apparatus of claim 4,
wherein the one or more communication transmissions includes a wireless local area network transmission and the channel estimation sequence comprises one or more of:
a long training field (LTF); or
a channel estimation field (CEF).

6. A first wireless device, comprising:
at least one antenna; and
a processor coupled to the at least one antenna and configured to cause the first wireless device to:
determine to perform a communication transmission to a second wireless device, wherein the communication transmission includes a plurality of data symbols;
determine to perform a first sensing measurement of a first reflector using a reflection of the communication transmission, wherein the first sensing measurement of the first reflector is based on a plurality of reflections corresponding to the plurality of data symbols;
transmit the communication transmission to the second wireless device;
receive, from the first reflector, the reflection of the communication transmission; and
perform the first sensing measurement of the first reflector using the reflection of the communication transmission, wherein at least one of a modified zero forcing estimator or a modified minimum mean square error estimator is used to perform a channel estimate of the plurality of reflections and the first sensing measurement of the first reflector is based on the channel estimate.

7. The first wireless device of claim 6,
wherein the processor is further configured to cause the first wireless device to:
receive, from a second reflector, a second reflection of the communication transmission; and
perform a second sensing measurement of the second reflector using the second reflection of the communication transmission.

8. The first wireless device of claim 7,
wherein the first sensing measurement and the second sensing measurement are ranging measurements, wherein the first sensing measurement includes a first time-of-flight estimate associated with the first reflector, and wherein the second sensing measurement includes a second time-of-flight estimate associated with the second reflector.

9. The first wireless device of claim 6,
wherein the first sensing measurement includes an angle-of-arrival measurement.

10. The first wireless device of claim 6,
wherein the first sensing measurement includes a measurement of speed or velocity.

11. The first wireless device of claim 6,
wherein the processor is further configured to cause the first wireless device to:
receive, from the second wireless device, a response to the communication transmission; and
continue communication with the second wireless device based on the response.

12. A method for performing a sensing measurement while performing communication, the method comprising:
at a first wireless device:
establishing communication with a second wireless device;
determining to perform a sensing measurement of a reflector while simultaneously communicating with the second wireless device, wherein said performing the sensing measurement of the reflector while simultaneously communicating with the second wireless device includes performing the sensing measurement without interrupting a data transfer with the second wireless device;
determining to perform the sensing measurement of the reflector using data symbols of the reflection of a packet, wherein said determining is based on a determination of availability of channel estimation sequences in scheduled transmissions;
transmitting, to the second wireless device, the packet;
receiving, from the reflector, a reflection of the packet; and
performing the sensing measurement based on the reflection of the packet.

13. The method of claim 12,
wherein the packet includes payload data for the second wireless device, wherein the method further comprises receiving, from the second wireless device, a response to the packet.

14. The method of claim 12, further comprising:
performing a channel estimate based on the reflection of the packet, wherein the sensing measurement is based on the channel estimate.

15. The method of claim 12, wherein the determination of availability of channel estimation sequences in scheduled transmissions is based on a number of long training fields (LTFs).

16. The method of claim 12, wherein the determination of availability of channel estimation sequences in scheduled transmissions is based on a number of channel estimation fields (CEFs).

17. The method of claim 12, further comprising:
receiving, from the second wireless device, a response to the packet.

18. The method of claim 12, further comprising:
receiving, from a second reflector, a second reflection of the packet; and
performing a second sensing measurement based on the second reflection of the packet.

19. The method of claim 12, wherein the determination of availability of channel estimation sequences in scheduled transmissions is based on a number of reference signals associated with cellular communication.

20. The method of claim 12, wherein the sensing measurement is performed based on one or more channel estimation sequences in addition to the data.

* * * * *